Figure 1:
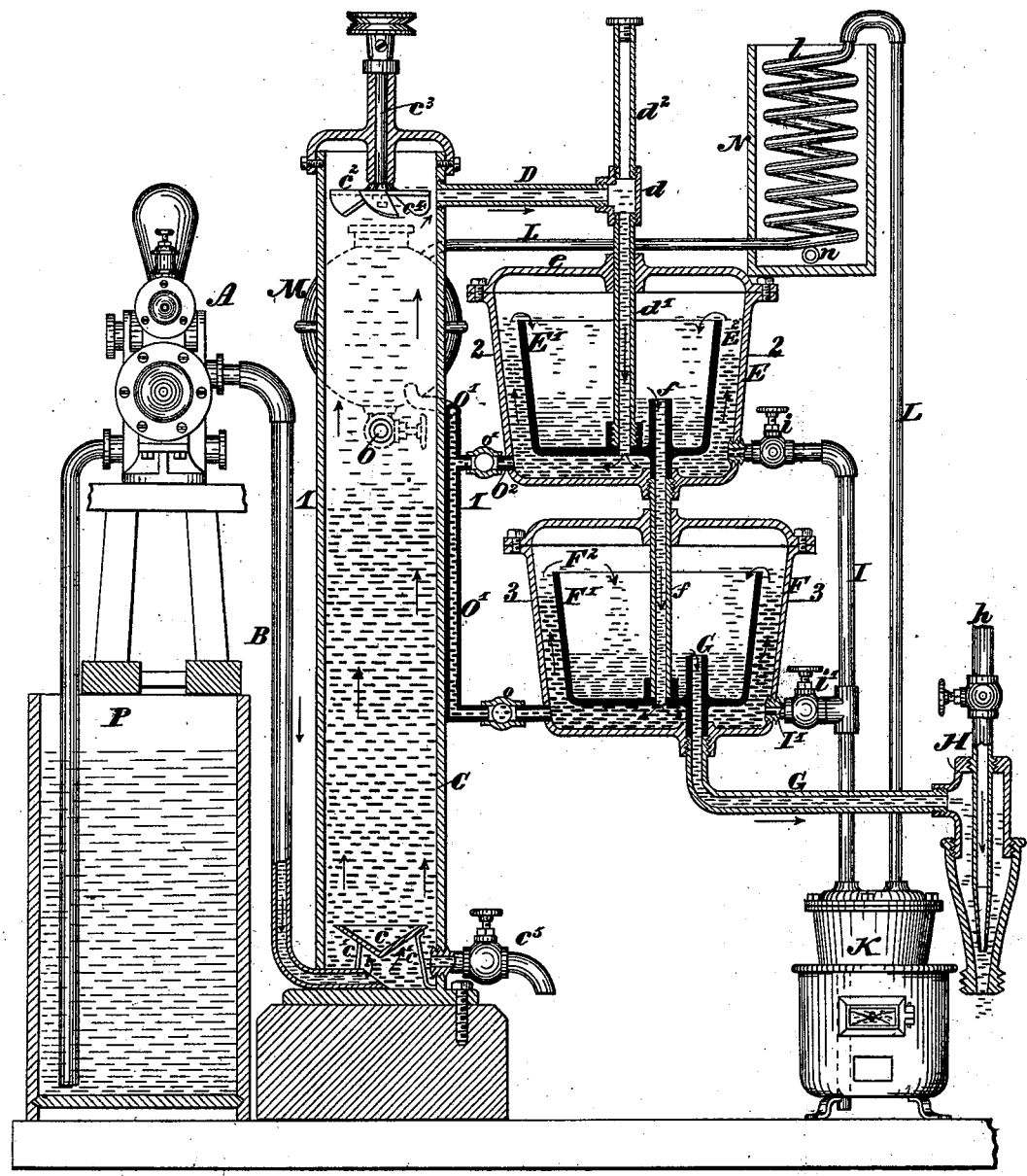

C. E. BALL.
Amalgamator.

No. 227,717.

Patented May 18, 1880.

WITNESSES:
S. J. Van Stavoren
R. E. Grant

INVENTOR,
Chas. E. Ball,
By Connolly Bros., ATTORNEYS.

UNITED STATES PATENT OFFICE.

CHARLES E. BALL, OF PHILADELPHIA, PENNSYLVANIA.

AMALGAMATOR.

SPECIFICATION forming part of Letters Patent No. 227,717, dated May 18, 1880.

Application filed December 18, 1878.

*To all whom it may concern:*

Be it known that I, CHARLES E. BALL, of Philadelphia, in the county of Philadelphia and State of Pennsylvania, have invented certain new and useful Improvements in Amalgamating Apparatus; and I do hereby declare the following to be a full, clear, and exact description of the invention, such as will enable others skilled in the art to which it pertains to make and use it, reference being had to the accompanying drawing, which forms part of this specification, in which—

Figure 1 is a longitudinal vertical section of my improved apparatus for amalgamating ores.

My invention has for its object to provide means for causing ore to pass through mercury by the combined forces of suction and pressure, or suction and gravity.

A further object of my invention is to provide means whereby ore will be caused to pass successively through two baths of mercury, or two or more vessels containing mercury.

A still further object of my invention is to provide means for retorting the amalgam to restore and use over again continuously the mercury employed in the amalgamating process or operation.

My invention accordingly consists, first, in the combination, with an ejector or suction apparatus located at the discharge end of the amalgamator, of two separate amalgamating-vessels, each adapted to hold mercury in fluid form, and located one over or above the other, with a communicating pipe extending through and some distance above the bottom of the upper vessel and through the top of and down into the lower vessel; second, in the novel construction and combination of details, as hereinafter described and claimed.

In the accompanying drawing, A indicates a force-pump of any usual or suitable construction. B is a pipe leading therefrom to a vertical cylinder, C.

Within the cylinder C is an inverted cone or distributer, $c$, sustained on supports $c'\ c'$, and a flutter-wheel or breaker, $c^2$, mounted on a shaft, $c^3$, and having radial inclined arms $c^4$.

D is a pipe leading from the cylinder C to a vessel, E, said pipe having a T-coupling, $d$, with branches $d'\ d^2$. The vessel E is a close vessel, having a tight lid, $e$; but within it is an open or topless vessel, E'. A space, $E^2$, is left between the two vessels E and E', entirely surrounding the latter. The pipe $d'$ passes through the bottom of the vessel E' and terminates above the bottom of the vessel E, so as to discharge, as hereinafter explained, its contents into the latter.

F and F' are other vessels similar to E and E', and $f$ is a pipe passing through the bottoms of the latter two and through that of vessel F', terminating above the bottom of vessel F.

G is a pipe which passes through the bottoms of vessels F and F', and leads off to an ejector, H, the steam-pipe connection of which is shown at $h$.

I is a pipe connecting the vessel E with a retort, K, and I' is a branch or connection with said pipe from vessel F, valves for said pipe I and branch I' being shown at $i$ and $i'$.

L is a pipe extending from the retort K to a mercury cup or vessel, M, being coiled at $l$ to form a still or condenser, where it passes through a water vat or tank, N, having an outlet-port, $n$.

O is a pipe leading from the mercury-cup M to the cylinder C, and O' is another pipe leading from same cup to the vessel F, said pipe having a branch, $O^2$, leading to vessel E, and both said pipe and branch being provided respectively with valves $o$ and $o'$.

The method of operation is as follows: Mercury is permitted to flow through pipes O, O', and $O^2$ into cylinder C and vessels E and F until it attains the depths therein indicated by the dotted lines 1 2 3, gages (not shown in the drawing) being employed to indicate said depths. Ore mixed with water to render it pulpy or semi-fluid is now forced from the tank P by the pump A through the pipe B into the cylinder C. Emerging from the pipe B, the ore meets the cone $c$, and is by said cone distributed or disseminated, passing thence upwardly through the mercury in said cylinder, its ascent being due to the pressure exerted by the pump A, by its own levity with reference to the mercury, and by the suction or vacuum produced by the ejector H, which is simultaneously operating. Reaching the top of the mercury, the ore is lifted by the suction produced by said ejector H and drawn into the pipe D, being struck and broken or distributed before entering said pipe by the arms $c$, which are kept constantly revolving at a high rate of speed. Passing downwardly through the branch $d'$, the branch $d^2$ being closed, the ore emerges from said branch $d'$, and passes thence upwardly through the mercury contained in the space $E^2$, and thence over the edge of vessel E' into said vessel, the suction upon the mercury in said space $E^2$ produced by the ejector H raising it so that, with the admission of ore, as already described, the latter will overflow into the vessel E'. When the ore has accumulated sufficiently in the vessel E' to be as high as the pipe $f$ it will thenceforward, upon increase, pass downwardly through said pipe into the vessel F, thence through the mercury in the space $F^2$, and, in the manner already described, into vessel F' and out through the pipe G to any convenient receptacle. In passing successively through the mercury contained in the cylinder C and vessels E and F the ore parts with its precious metals, which amalgamate with said mercury, so that only waste or earthy matter deprived of its minerals passes out the pipe G and ejector H.

The amalgam in the vessels E and F is drawn off from time to time through the pipe I and branch I' into retort K, where it is retorted in the usual manner, the vapors of the mercury ascending through the pipe L being condensed at $l$ and allowed to flow back into mercury-cup M, to be used over again.

In lieu of the pump A, a stand-pipe may be connected with the branch $d^2$, and the ore caused to pass through the apparatus by the combined forces of its gravity and the suction of the ejector H. In such case the cylinder C would be dispensed with, or communication therewith cut off by a valve located in pipe D. When said cylinder is employed its amalgam may be drawn off, when required, through a cock, $c^5$.

What I claim as my invention is—

1. A tight or close vessel, E, in combination with an open or topless vessel, E', contained therein, and inlet and outlet pipes $d'$ and $f$, the latter rising above the bottom of the inner vessel, substantially as shown and described, said vessels and pipes being relatively so arranged that ore admitted through said inlet-pipe will pass between said inner and outer vessels and through the mercury, the waste passing thence into said inner vessel, and from the latter outwardly and onwardly through said discharge-pipe, while the amalgam carried into the inner vessel remains therein.

2. The combination, with an ejector or suction apparatus located at the discharge end of the apparatus, of two separate amalgamating-vessels, each adapted to hold mercury in fluid form, and located one over or above the other, with a communicating pipe, $f$, extending through and some distance above the bottom of the upper vessel and through the top of and down into the lower vessel, substantially as shown and described.

3. The combination of vessels E, E', F, and F' and pipes $d'$, $f$, and G, constructed substantially as shown and described.

4. In combination with an amalgamating apparatus and a mercury cup or holder, a retort connected with both, and a condenser located between said retort and mercury-cup, substantially as and for the purpose set forth.

In testimony that I claim the foregoing I have hereunto set my hand this 14th day of December, 1878.

CHAS. E. BALL.

Witnesses:
M. D. CONNOLLY,
CHAS. F. VAN HORN.